(12) United States Patent
Jensen et al.

(10) Patent No.: US 7,035,718 B2
(45) Date of Patent: Apr. 25, 2006

(54) METHOD AND SYSTEM FOR DETECTING AND REDUCING DRAFT TUBE PRESSURE FLUCTUATIONS

(75) Inventors: Raymond Verle Jensen, Gardnerville, NV (US); James Robert Rasmussen, Bellevue, WA (US)

(73) Assignee: General Electric Company, Schenectady, NY (US)

( * ) Notice: Subject to any disclaimer, the term of this patent is extended or adjusted under 35 U.S.C. 154(b) by 162 days.

(21) Appl. No.: 10/707,944

(22) Filed: Jan. 27, 2004

(65) Prior Publication Data

US 2005/0165510 A1   Jul. 28, 2005

(51) Int. Cl.
G05B 13/00 (2006.01)

(52) U.S. Cl. ............... 700/280; 700/286; 700/287; 73/35.09; 73/35.05; 73/570; 73/690; 73/862.41; 73/862.59

(58) Field of Classification Search ......... 700/280, 700/286, 287; 73/35.09, 570, 690, 862.41, 73/862.59, 35.05; 415/157, 43, 119, 117, 415/910, 914
See application file for complete search history.

(56) References Cited

U.S. PATENT DOCUMENTS

| 4,441,029 A | * | 4/1984 | Kao | 290/52 |
|---|---|---|---|---|
| 4,898,512 A | | 2/1990 | Geffs, John J. | 415/1 |
| 5,261,787 A | * | 11/1993 | Morgunov | 415/208.1 |
| 5,347,846 A | * | 9/1994 | Kitano et al. | 73/35.04 |
| 5,373,448 A | * | 12/1994 | Katogi et al. | 701/111 |
| 5,408,863 A | * | 4/1995 | Sawyers et al. | 73/35.05 |
| 5,541,857 A | * | 7/1996 | Walter et al. | 700/280 |
| 6,490,506 B1 | * | 12/2002 | March | 700/286 |
| 6,546,328 B1 | * | 4/2003 | Slicker | 701/111 |

(Continued)

FOREIGN PATENT DOCUMENTS

JP        2001323867 A * 11/2001

OTHER PUBLICATIONS

Specifications and Ordering Information 3500/46M Hydro Monitor, [online]; [retrieved on Jan. 14, 2004]; retrieved from the Internet at http://www.bently.com/prod/products/144408.htm.

(Continued)

Primary Examiner—Anthony Knight
Assistant Examiner—Thomas Pham
(74) Attorney, Agent, or Firm—Cantor Colburn LLP

(57) ABSTRACT

A method and system to reduce vibration in a turbine-generator including measuring a magnitude of radial vibration of a turbine shaft with at least one vibration sensor configured to generate a vibration signal indicative of vibration frequency; measuring a generator power output with a power output sensor configured to generate a generator power output signal; detecting vibration frequencies in a rough load zone range; engaging an air injection means when a magnitude of radial vibration detected in the rough load zone range is above a predetermined threshold; storing a generator power output level as a reference level when engaging the air injection means; and disengaging the air injection means when either the measured generator power output exceeds a predetermined level or the measured generator power output differs from the reference level by a predetermined amount.

22 Claims, 4 Drawing Sheets

U.S. PATENT DOCUMENTS 6,751,602 B1 * 6/2004 Kotoulas et al. .............. 706/23
6,768,218 B1 * 7/2004 Yumita ........................ 290/54

OTHER PUBLICATIONS

Overview of the 3500 Monitoring System of Bently Nevada, [online]; [retrieved on Jan. 14, 2004]; retrieved from the Internet at http://www.geocities.com;alfiefernandes/bentlynevada.htm.

Bart Milana, "Facilities-Oriented R&D Produces Pratical Results;" Hydro Review, 2004 Industry Sourcebook, Jan., 2004.

* cited by examiner

METHOD AND SYSTEM FOR DETECTING AND REDUCING DRAFT TUBE PRESSURE FLUCTUATIONS

BACKGROUND OF THE INVENTION

This invention relates to hydraulic reaction turbines; and, more particularly, to a system and method for reducing the effects of draft tube pressure fluctuations acting on a runner in a hydraulic reaction turbine.

Hydraulic reaction turbines have been known in the art for many years. In the early development of such turbines, it was discovered that turbines which were operated at heads and flows other than the design point of the turbine, experienced rough operation and power swings resulting from water passing out through the draft tube of the turbine in a whirling and spiraling vortex. This is particularly true of Francis-type turbines, propeller turbines and pump turbines. In April 1940, W. J. Rheingans published a paper in the Transactions of the American Society of Mechanical Engineers in which he outlined the results of an extensive study of the draft tube surging phenomenon in turbines. In his paper, and in the comments from others, several schemes for suppressing draft tube surging were discussed; these included fins projecting from the draft tube walls, an extended runner cone filling the space occupied by the draft tube vortex, venting of the turbine head cover and air injection into the draft tube through the straightening fins and through a hole in the draft tube wall. Since that time there have been numerous papers on the subject and many suggested schemes to reduce draft tube surging. Such schemes have included air admission to the turbine runner, to the draft tube, to the lower side of the runner through the runner cone, or through holes in streamlined shapes placed across the draft tube. Air has also been injected into the penstock, into the space between the wicket gates and the runner, and through the runner band. There have also been many schemes for the use of fins in the draft tube; these include flow splitters and a coaxial hollow cylinder placed below the center of the runner cone and supported by fins which can be rotated, and several types of fins as discussed hereinabove.

When a hydraulic reaction turbine is operated at a head and/or flow which is different from the design point, the water will follow a helical path as it passes out through the draft tube. If the operating conditions are sufficiently remote from the design point, a vortex will form in the swirling water just below the runner cone and this vortex usually will follow a helical path as it passes out through the draft tube. The core of the vortex is usually filled with water vapor. The spiraling vortex causes pressure fluctuations which vary the net head experienced by the runner and cause the generated power to fluctuate in a similar manner. Net head is also affected when the water vapor bubbles in the core of the vortex collapse.

In hydro facilities that use reaction style turbine runners, there is a hydrodynamic instability that occurs at partial load. This instability is often referred to as the rough load zone and corresponds with Rheingans influence discussed above. This instability typically occurs when the turbine-generator is operated in a region of 25% to 75% of the rated machine power output capacity, as the rough load zone varies for each machine. The result of this instability is high vibration of the machine components, with the possibility of damage or premature wear to various machine components. The frequency of this vibration is typically between 0.15 and 0.35 times the running speed of the machine.

In order to minimize this vibration, air is injected into the flow of water through the turbine. The accepted industry practice is either to provide air injection constantly during operation or based on generator load. However, operation of compressors to inject air is an additional expense which reduces plant profits.

Thus, there is a need to enable operators of hydro facilities using reaction style turbine runners to engage air injection equipment to reduce vibration due to hydraulic effects at partial load and engage such equipment only when necessary due to vibration. There is also a desire to minimize the costs associated with air compression while protecting the hydro machine from damage or excessive wear due to vibration caused by the instability.

BRIEF DESCRIPTION OF THE INVENTION

The above discussed and other drawbacks and deficiencies are overcome or alleviated in an exemplary embodiment by a method to reduce vibration in a turbine-generator including measuring a magnitude of radial vibration of a turbine shaft with at least one vibration sensor configured to generate a vibration signal indicative of vibration frequency and said magnitude; measuring a generator power output with a power output sensor configured to generate a generator power output signal; detecting vibration frequencies in a rough load zone range; engaging an air injection means when a magnitude of radial vibration detected in the rough load zone range is above a predetermined threshold; storing a generator power output level as a reference level when engaging the air injection means; and disengaging the air injection means when either the measured generator power output exceeds a predetermined level or the measured generator power output differs from the reference level by a predetermined amount.

In another exemplary embodiment, a system to reduce vibration in a turbine-generator is disclosed. The system includes at least one vibration sensor measuring a magnitude of radial vibration of a turbine shaft, the at least one vibration sensor configured to generate a vibration signal indicative of vibration frequency and magnitude; a power output sensor measuring a generator power output, the power output sensor configured to generate a generator power output signal; a monitoring system configured to receive the vibration signal and generator power output signal; a computer in operable communication with the monitoring system, the computer configured to detect vibration frequencies in a rough load zone range; and an air injection means configured to engage when a magnitude of radial vibration detected in the rough load zone range is above a predetermined threshold, wherein a generator power output level is stored in the computer as a reference level when engaging the air injection means, the air injection means being disengaged when either the measured generator power output exceeds a predetermined level or the measured generator power output differs from the reference level by a predetermined amount.

The above-discussed and other features and advantages of the present invention will be appreciated and understood by those skilled in the art from the following detailed description and drawings.

BRIEF DESCRIPTION OF THE DRAWINGS

Referring now to the drawings wherein like elements are numbered alike in the several Figures.

DETAILED DESCRIPTION OF THE INVENTION

Figure 1:
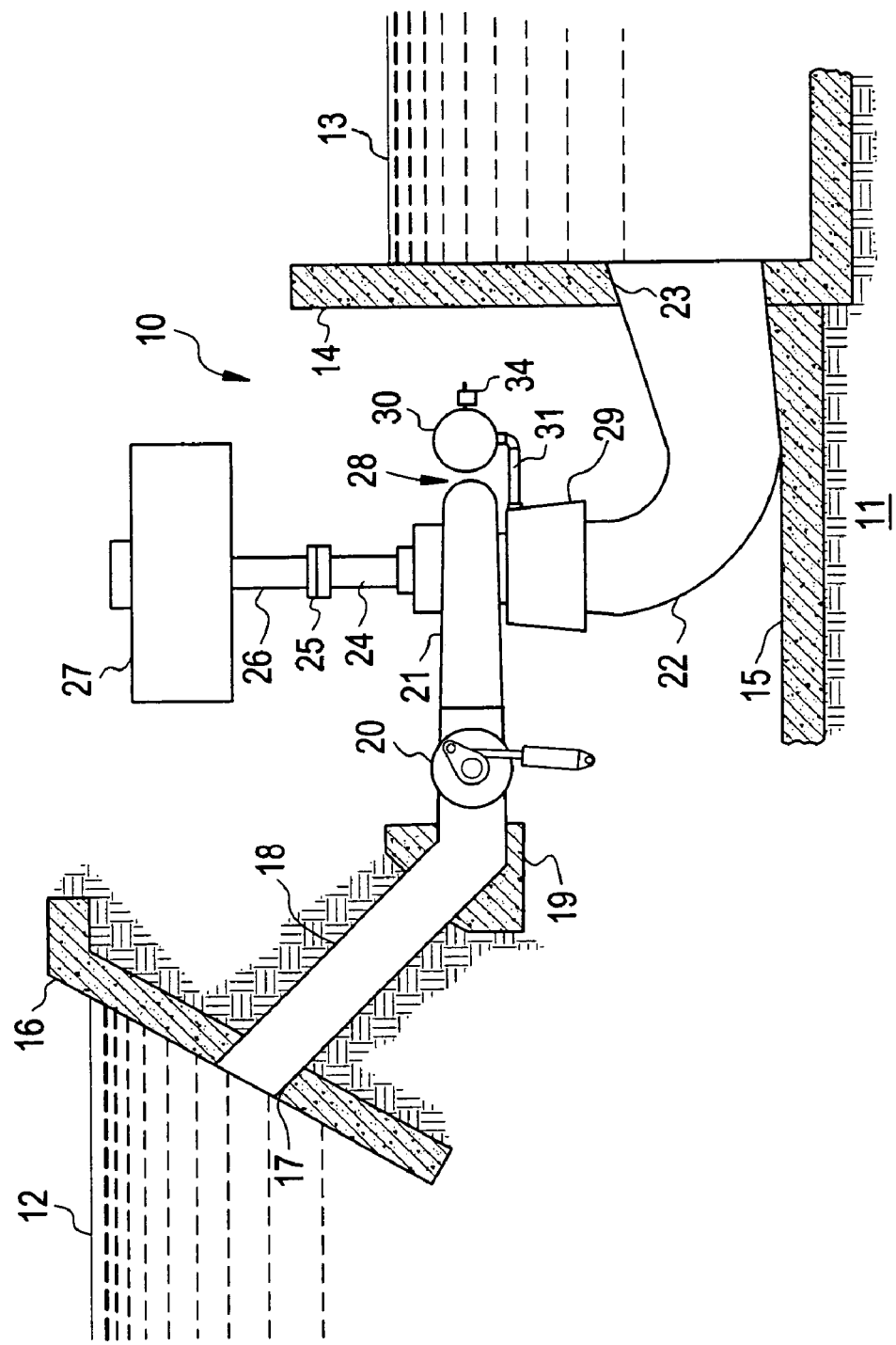
FIG. 1 is an elevational view, partly schematic and partly sectional, of a prior art hydraulic reaction turbine system.

Referring to FIG. 1, a hydraulic turbine system 10 is shown having a base foundation 11, an elevated source of water 12 and a lower tail water reservoir 13. Foundation 11 includes a generally vertical back wall 14 setting off the tail water in reservoir 13 with a floor 15 on base foundation 11 extending from wall 14.

An intake structure 16 is provided on the foundation at the upper or elevated water source 12. An opening 17 is provided in structure 16 fluidly communicating with a downwardly slanted penstock 18 extending through structure 16. Penstock 18 leads through, and is supported in, an anchor block 19 and from said block 19 through the shut-off valve 20 of the turbine in system 10.

From valve 20, penstock 18 extends to the hydraulic reaction turbine 21 of system 10 fluidly communicating with a draft tube 22 which in turn communicates with the tail water reservoir 13 through an opening 23 in wall 14.

A turbine shaft 24 communicates with the runner (not visible in FIG. 1) in the interior of turbine 21, as is well known in the turbine art, and shaft 24 is coupled via coupling 25 to a generator shaft 26. Shaft 26 is in turn coupled to the rotor (not visible in FIG. 1) of generator 27 for driving the same.

The foregoing describes conventional parts of a typical hydraulic reaction turbine system in a hydroelectric generating station and, as such, forms no part of the invention other than in the environment of draft tube pressure fluctuations acting on the runner of the turbine 21 as will now be described. Thus, the turbine runner of the turbine 21 drives the turbine shaft 24 which in turn drives the generator shaft 26 through coupling 25. The shaft 26 drives the rotor of generator 27, which may be a synchronous generator, thereby generating electricity.

Thus, as contemplated in the present invention, draft tube pressure fluctuations reducing means 28 are provided for reducing the effect of draft tube pressure fluctuations acting on the runner of turbine 21. (See FIG. 2).

Figure 2:
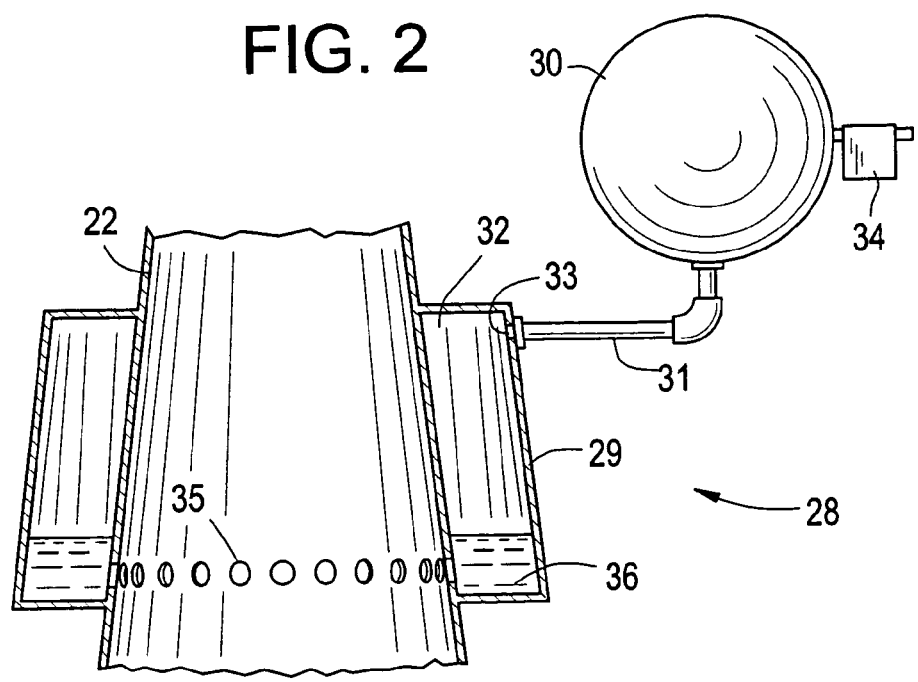
FIG. 2 is a section through the draft tube and suppression chamber of FIG. 1.

As particularly seen in FIG. 2, such means 28 may include, but is not limited to, a surge suppression chamber 29 surrounding draft tube 22 adjacent turbine 21. Chamber 29 is toroidally-shaped and welded or otherwise secured to the outer peripheral surface of draft tube 22. An air tank or air reservoir 30, or other source of air (e.g., compressor in FIG. 4), is provided having a pipe or conduit 31 leading to the outer wall of chamber 29 and communicating with the interior 32 of chamber 29 via opening 33. A conventional air pressure regulator 34 coupled to tank 30 is provided for regulating the pressurized air therein. As seen in FIG. 2, a plurality of spaced openings or holes 35 extend about the outer periphery of draft tube 22 adjacent the floor or lower wall 36 of chamber 29. These holes 35 extend through the wall of draft tube 22 and serve to fluidly communicate the interior of draft tube 22 with the interior of chamber 29.

Figure 3:
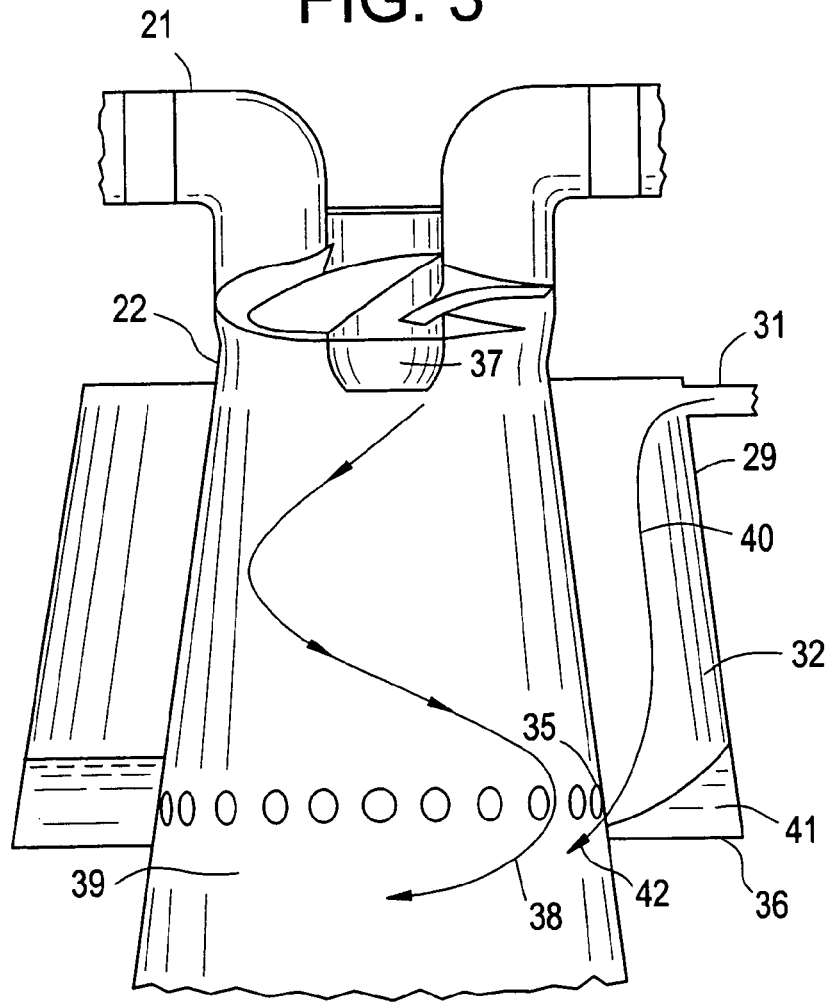
FIG. 3 is a schematic illustration of the helical effect taking place in the draft tube of the apparatus of FIGS. 1 and 2.

As seen schematically in FIG. 3, during operation of system 10, a vortex can form below the tip of the nose cone 37 of the runner of the hydraulic reaction turbine 21. The center of the vortex is a low pressure area which is usually below the vapor pressure of water at the same relative temperature. The vortex can follow a helical path in the interior 39 of draft tube 22. Air from tank 30, regulated by regulator 34, is introduced into the interior 32 of chamber 29 where it flows through holes 35 into the interior 39 of draft tube 22 as indicated by arrow 40. This air meets vortex 38 and abates the same. Simultaneously, water 41, trapped at the bottom of chamber 29, flows with the air through holes 35 back into the interior 39 of draft tube 22, as indicated by arrow 42 which is in essence a continuation of 40.

The chamber 29 acts as a surge suppression chamber and said means 28 performs two functions. First, it injects air or water into the lower pressure center of the draft tube vortex 38 as vortex 38 rotates in its peculiar spiral or helical path inside of draft tube 22. Second, it provides an air cushion to dampen pressure pulsations traveling up through draft tube 22 to the hydraulic reaction turbine 21.

Although only a single series of holes 35 are illustrated about the outer periphery of draft tube 22, obviously more than one such row of holes or openings may be provided, such plurality of rows may be of any desired configurations.

Although the foregoing discusses a turbine, similar effects take place in a pumping operation. However, most problems of this nature as discussed herein occur in a turbine or generating operation.

The size and number of air entry points or holes depends on the diameter of the draft tube at the interconnecting point to the turbine draft tube, the rotating speed of the machine, the magnitude of the draft tube surge which is expected and the size of the surge suppression chamber. The Rheingans formula for frequency of draft tube surges is still considered as a good means for estimating surge frequency. It is $$\text{frequency} = \frac{\text{Rotation speed}}{3.6}.$$

For the surge suppression chamber to attenuate the pressure pulsations caused by draft tube surging, the total area of the ring of holes must be sufficiently large to accommodate water flow into the surge chamber and out again within the time allowed by the draft tube surge frequency. For example, a 200 RPM machine could experience a draft tube surge at frequency=200 RPM/3.6=55.6 cycles/minute.

Air can be injected in any desired quantity, such as between about 0.05 to 2% of the unit flow. With peripheral air injection as disclosed herein, the volume of air at standard temperature and pressure injected may be as low as 0.05% of the unit flow. The least quantity of air injection required to suppress the draft tube surges is desirable and the operator can observe the conventional wattmeter on the unit control board to determine such (or even by audible discernment, as such surges are quite noisy). By placing the holes as close as possible to the bottom of the surge suppression chambers, the largest possible air bubble is created which cushions pressure pulsations in the draft tube. The air bubble or bubbles act as a cushion or shock absorber and abate the pressure wave before it reaches the turbine runner. Conventionally, air is injected into the holes continually when the apparatus is running. Air pressure pulsations come up the draft tube and reach the holes. The water carried by the air pressure pulsations sloshes through the holes into the surge suppression chamber and the air cushion dampens the pressure pulsations. However, as discussed above, continual operation of compressors to continually inject air is an additional expense which reduces plant profits.

Figure 4:
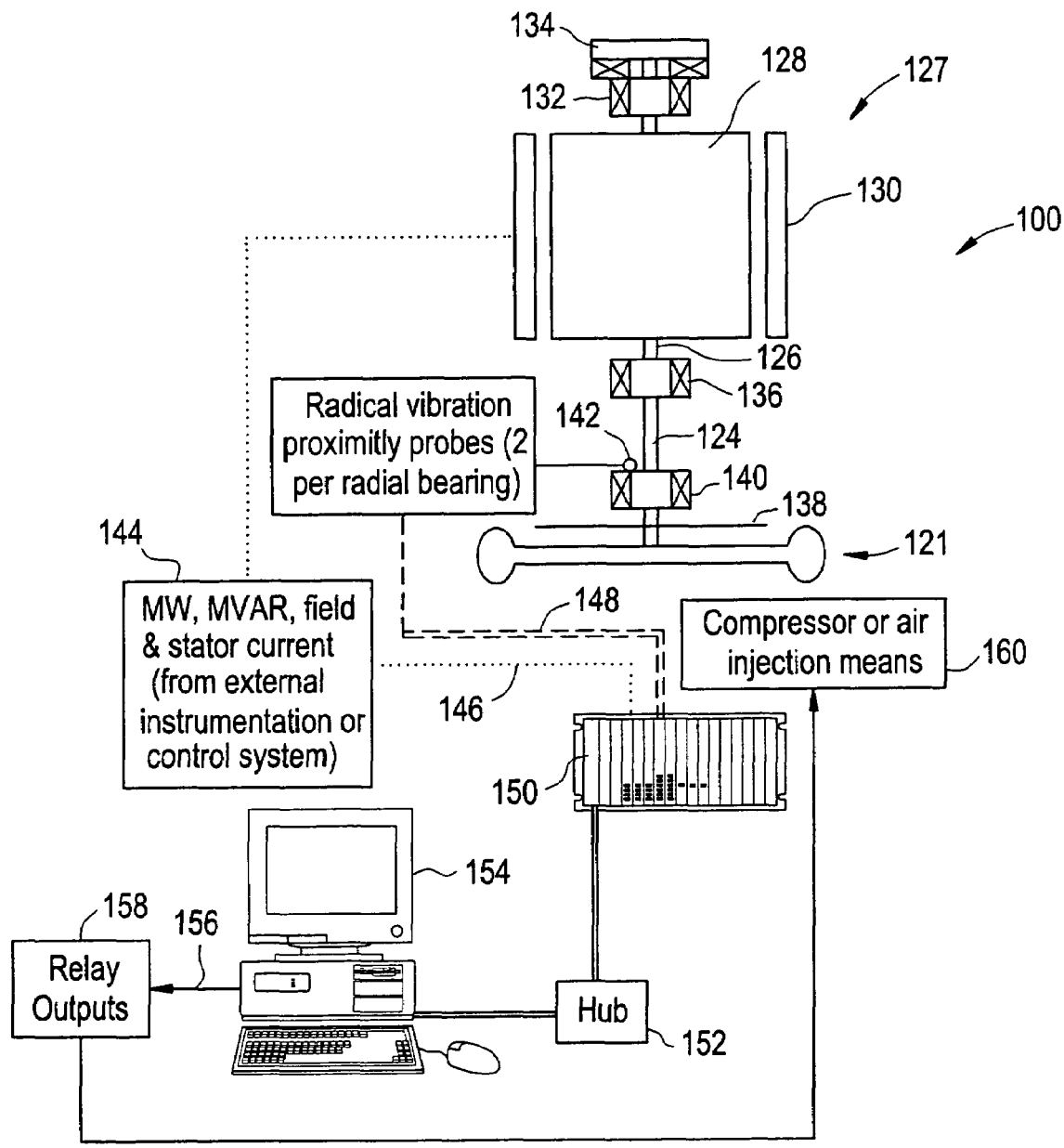
FIG. 4 is a schematic illustration of a hydro turbine-generator system in sensor communication with a monitoring system which is in communication with a computer to operably control a relay for an air injection means in fluid communication with the turbine in accordance with an exemplary embodiment of the invention.

Referring to FIG. 4, an exemplary embodiment of a hydraulic turbine-generator system 100 is illustrated that is configured to operate a compressor to inject air only when necessary due to vibration while protecting the hydro machine from damage or excessive wear due to vibration caused by instability or pressure pulsations. Turbine-generator system 100 includes a turbine runner 121 rotatable about a turbine shaft 124. Turbine shaft 24 communicates with the runner in the interior of the turbine, as is well known in the turbine art, and shaft 124 is coupled to a generator shaft 126. Shaft 126 is in turn coupled to a rotor 128 of a generator 127 for driving the same. Rotor 128 is surrounded by a stator 130 configured to generate electricity from rotation of rotor 128.

Shaft 126 is defined at one end extending from rotor 128 having a radial bearing 132 and a thrust bearing 134. Shaft 126 communicates with shaft 124 at another end extending from rotor 128 via a second radial bearing 136. Shaft 124 communicates with turbine runner 121 through a head cover 138. Shaft 124 extends through a third radial bearing 140 intermediate second radial bearing 136 and head cover 138.

At least one transducer or vibration sensor 142 observing radial motion of rotor 128 that the hydro turbine is attached to is mounted as near the turbine 121 as possible. In an exemplary embodiment as illustrated in FIG. 4, two sensors (only one shown) are disposed proximate third radial bearing 140. The two sensors are disposed substantially orthogonal to one another relative to an axis defining turbine shaft 124. In an exemplary embodiment, two eddy current proximity probes are utilized in this arrangement, and preferably mounted near the third radial bearing or turbine guide bearing 140 as illustrated. A power output measuring sensor 144 is employed for measurement of the generator power output. In an exemplary embodiment, measuring sensor 144 is a MW meter configured to measure the power output of generator 127. The signals 146 and 148 from the sensor(s) 144 and 142, respectively, are fed into a monitoring system 150, and then, via a hub 152, to a computer 154 that processes signals 146, 148 and applies logic to the results.

In an exemplary embodiment, monitoring system 150 is a commercially available Bently Nevada 3500 monitoring system which supplies the signal information 146, 148 to computer 154 running Bently Nevada System 1 software with Decision Support. The signal 148 from the at least one transducer 142 is filtered to look at sensed vibration magnitudes at frequencies in the region of about 0.15 to about 0.35 times the running speed of the machine. This is the typical frequency range that rough load zone vibration manifests itself. When the level or magnitude of vibration in the rough load zone (i.e., 0.15–0.35×RPM) rises above a pre-set threshold, for example, but not limited to, 10 mil or 0.010 inch, the logic in computer 154 generates a relay output signal 156 that closes a relay 158 to engage an air injection means 160. In an exemplary embodiment, air injection means includes, but is not limited, to, one or more compressors that inject air to reduce the vibration. The relay 158 remains latched even when the level of vibration is reduced to avoid cycling the compressor on and off. In order to accomplish this, the relay latch is tied to the power output of the generator 127. When relay 158 is closed, the power output signal 146 of the generator 127 at that time is stored away as a reference value in computer 154. The relay 158 remains latched and compressor(s) 160 continue operation until the generator power output changes by a certain amount compared to the reference level or until the generator output exceeds a predetermined limit. This amount or limit can be different for the generator increasing load versus decreasing load. For example, a decreasing load limit may be set at 5 MW compared to an increasing load limit set at 20 MW. If the vibration increases after the relay latch is released, the routine starts over with a new generator power reference sample.

Figure 5:
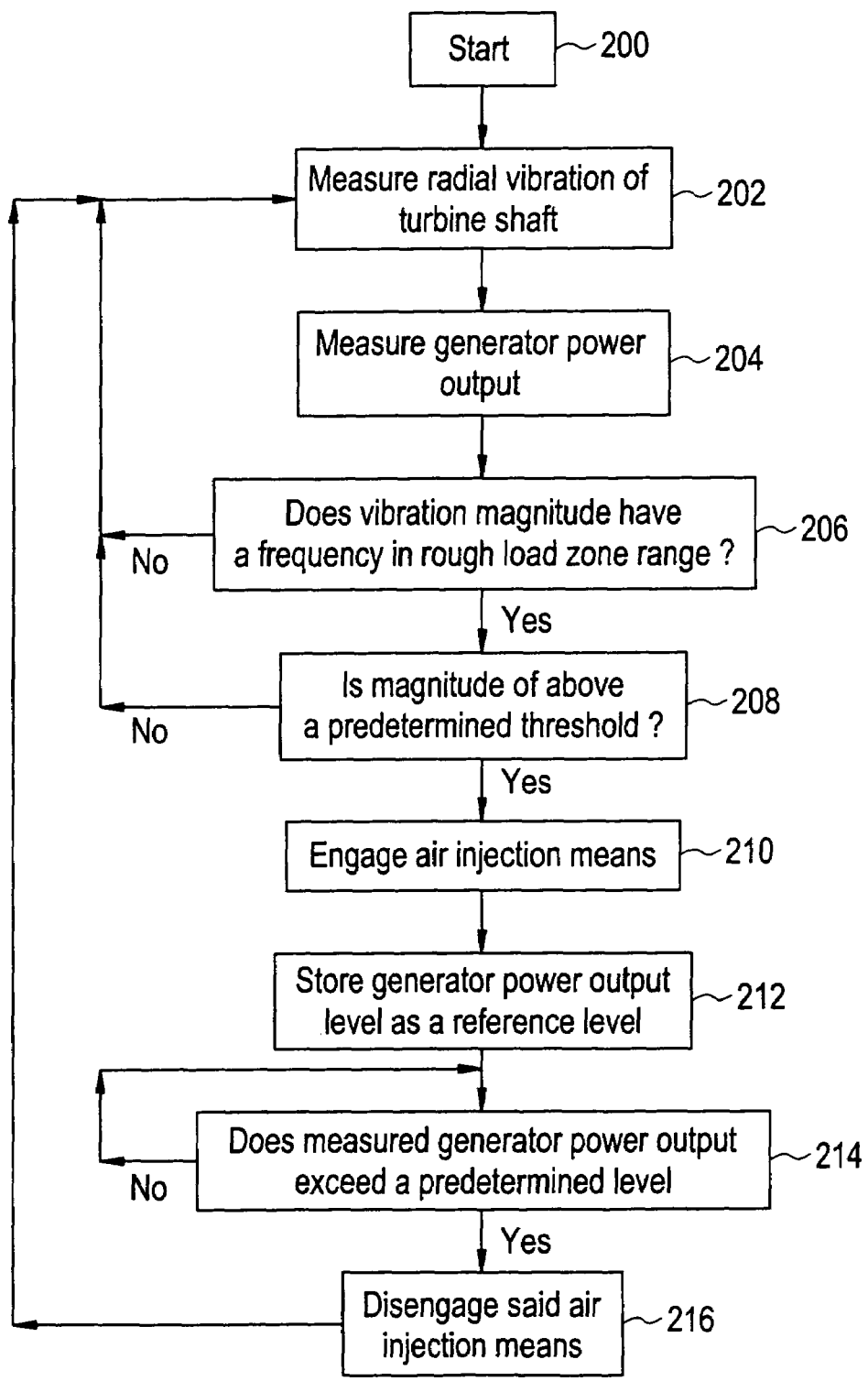
FIG. 5 is a flow chart illustrating an exemplary embodiment of a method to reduce vibration of components of the hydro turbine-generator system of FIG. 4 without continual operation of the air injection means.

Referring now to FIG. 5, a flow chart routine of an exemplary embodiment of a method to reduce vibration of components of the hydro turbine-generator system 100 of FIG. 4 without continual operation of the air injection means 160 is illustrated. The routine initializes at block 200 and measures a magnitude of radial vibration proximate turbine shaft 124 with at least one vibration sensor 142 configured to generate a vibration signal 148 indicative of vibration frequency at block 202. At block 204, generator power output is measured with power output sensor 144 configured to generate generator power output signal 146. Signals 146 and 148 are received by monitoring system 150 and processed by computer 154. Computer 154 determines whether the sensed vibration frequencies are in a rough load zone range of between about 0.15 to about 0.35 times an operating speed of the generator at block 206. Preferably, the vibration signals are filtered to determine the magnitude of vibration in the rough load zone range. If vibration frequencies are not in the rough load zone, then block 202. If vibration frequencies are in the rough load zone, computer 154 determines whether the level or magnitude of vibration exceeds a predetermined threshold value at block 208, if not block 202. An air injection means 160 is engaged when the magnitude of radial vibration detected in said rough load zone range is above the predetermined threshold value at block 210. A generator power output level is stored as a reference level when engaging the air injection means 160 at block 212. Engagement of the air injection means 160 is latched to the generator power output, such that computer 154 continually checks to determine whether the measured generator power output exceeds a predetermined level at block 214. The air injection means 160 is disengaged when either the measured generator power output exceeds the predetermined level or the measured generator power output differs from the reference level by a predetermined amount at block 216.

In this above routine, disengagement of the air injection means 160 is not dependent on the change of vibration so as to avoid cycling the air injection means 160 on and off. Furthermore, it will be appreciated by one skilled in the pertinent art that the amount or limit can be different for the generator increasing load versus decreasing load. If the vibration increases when the relay latch is released or the air injection means 160 is otherwise disengaged, the routine starts over with a new generator power output reference sample stored if vibration detected in the rough load zone equates to or exceeds the predetermined threshold.

It can be seen that there is disclosed a simple and inexpensive system and process for abating the vortex created in a hydraulic reaction turbine or centrifugal pump, while limiting operation of an air injection means. In an exemplary embodiment described herein, the system and method minimize the costs associated with air compression while protecting the hydro machine from damage or excessive wear due to vibration caused by the instability in the rough load zone.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A method to reduce vibration in a turbine-generator comprising:
   measuring a magnitude of radial vibration of a turbine shaft with at least one vibration sensor configured to generate a vibration signal indicative of vibration frequency;
   measuring a generator power output with a power out-put sensor configured to generate a generator power output signal;
   detecting vibration frequencies in a rough load zone range;
   engaging an air injection means when a magnitude of radial vibration detected in said rough load zone range is above a predetermined threshold;
   storing a generator power output level as a reference level when said engaging said air injection means; and
   disengaging said air injection means when one of said measured generator power output exceeds a predetermined level and said measured generator power output differs from said reference level by a predetermined amount.

2. The method of claim 1 further comprising:
   filtering said vibration signal to determine said magnitude of vibration in said rough load zone range.

3. The method of claim 1 further comprising:
   latching engagement of said air injection means to said generator power output.

4. The method of claim 1, wherein said air injection means includes regulating means for regulating the injection of air into the turbine.

5. The method of claim 4, wherein said air injection means includes a compressor.

6. The method of claim 1, wherein said predetermined amount is one of the same and different for generator increasing load and decreasing load.

7. The method of claim 1, wherein if vibration increases causing said air injection means to engage after said air injection means has been disengaged, a new generator power output reference level is stored.

8. The method of claim 1, wherein said at least one vibration sensor includes two vibration sensors disposed substantially orthogonal to one another relative to an axis of said turbine shaft to measure vibration in multiple planes.

9. The method of claim 1, wherein said vibration sensor includes an eddy current proximity probe proximate a turbine guide bearing.

10. The method of claim 1, wherein a relay is closed to engage said air injection means, said relay remaining latched even though said magnitude of radial vibration is below said predetermined threshold to avoid cycling said air injection means on and off.

11. The method of claim 1, wherein the rough load zone range is between about 0.15 to about 0.35 times an operating speed of the generator.

12. A system to reduce vibration in a turbine-generator comprising:
    at least one vibration sensor measuring a magnitude of radial vibration of a turbine shaft, said at least one vibration sensor configured to generate a vibration signal indicative of vibration frequency and said magnitude;
    a power output sensor measuring a generator power output, said power output sensor configured to generate a generator power output signal;
    a monitoring system configured to receive said vibration signal and said generator power output signal;
    a computer in operable communication with said monitoring system, said computer configured to detect vibration frequencies in a rough load zone range; and
    an air injection means configured to engage when a magnitude of radial vibration detected in said rough load zone range is above a predetermined threshold, wherein a generator power output level is stored in said computer as a reference level when said engaging said air injection means, said air injection means being disengaged when one of said measured generator power output exceeds a predetermined level and said measured generator power output differs from said reference level by a predetermined amount.

13. The system of claim 12, wherein said vibration signal is filtered to determine said magnitude of vibration in said rough load zone range.

14. The system of claim 12, wherein engagement of said air injection means is latched to said generator power output.

15. The system of claim 12, wherein said air injection means includes regulating means for regulating the injection of air into the turbine.

16. The system of claim 15, wherein said air injection means includes a compressor.

17. The system of claim 12, wherein said predetermined amount is one of the same and different for generator increasing load and decreasing load.

18. The system of claim 12, wherein a new generator power output reference level is stored if vibration increases causing said air injection means to engage after said air injection means has been disengaged.

19. The system of claim 12, wherein said at least one vibration sensor includes two vibration sensors disposed substantially orthogonal to one another relative to an axis of said turbine shaft to measure vibration in multiple planes.

20. The system of claim 12, wherein said vibration sensor includes an eddy current proximity probe proximate a turbine guide bearing.

21. The system of claim 12 further comprising a relay configured to close to engage said air injection means, said relay remaining latched even though said magnitude of radial vibration is below said predetermined threshold to avoid cycling said air injection means on and off.

22. The system of claim 12, wherein the rough load zone range is between about 0.15 to about 0.35 times an operating speed of the generator.

* * * * *